(12) United States Patent
Stogsdill et al.

(10) Patent No.: US 11,181,301 B1
(45) Date of Patent: Nov. 23, 2021

(54) COMBUSTION GAS PERMEABLE CONDENSATION TRAYS FOR WATER HEATING SYSTEMS

(71) Applicant: Rheem Manufacturing Company, Atlanta, GA (US)

(72) Inventors: Jeffrey Stogsdill, Senatobia, MS (US); Qian Zhang, Montgomery, AL (US); Govinda Mahajan, Pike Road, AL (US); Joshua Renier, Montgomery, AL (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 17/023,542

(22) Filed: Sep. 17, 2020

(51) Int. Cl.
*F24H 8/00* (2006.01)
*F24H 9/00* (2006.01)
*F24H 1/00* (2006.01)
*F24H 1/14* (2006.01)

(52) U.S. Cl.
CPC ............. *F24H 8/00* (2013.01); *F24H 1/0072* (2013.01); *F24H 1/145* (2013.01); *F24H 9/0015* (2013.01); *F24H 9/0026* (2013.01); *F24D 2200/32* (2013.01)

(58) Field of Classification Search
CPC ........ F28F 17/005; F24H 8/003; F24H 8/006; B01D 5/009; F24F 13/222; F28B 9/08; F25D 21/14
See application file for complete search history.

(56) References Cited

U.S. PATENT DOCUMENTS

| 5,476,088 | A | * | 12/1995 | Hamos | F24H 8/006 126/110 R |
| 7,360,535 | B2 | * | 4/2008 | Kobayashi | F24H 8/006 126/350.1 |
| 10,139,127 | B2 | * | 11/2018 | Miura | F24H 8/006 |
| 2015/0308711 | A1 | * | 10/2015 | Gillan | F24H 8/003 122/14.3 |
| 2019/0078772 | A1 | * | 3/2019 | Jacques | F22B 33/08 |

FOREIGN PATENT DOCUMENTS

| CN | 2012-D87564 | * | 10/2011 |
| CN | 2016-097781 | * | 5/2014 |
| GB | 1987-259025 | * | 3/1987 |

* cited by examiner

*Primary Examiner* — Gregory A Wilson
(74) *Attorney, Agent, or Firm* — Troutman Pepper Hamilton Sanders LLP; James E. Schutz; Micah B. Hensley

(57) ABSTRACT

A condensation tray for condensing tankless water heaters is disclosed. The tray can include a plurality of peaks and valleys. The peaks can divert condensate runoff from a secondary heat exchanger into the valleys so as to prevent the condensate from falling on a primary heat exchanger. The tray includes gas apertures that enable combustion gases to pass through the tray and across the secondary heat exchanger. Overhangs on the peaks can prevent the condensate from draining through the gas apertures.

20 Claims, 8 Drawing Sheets

COMBUSTION GAS PERMEABLE CONDENSATION TRAYS FOR WATER HEATING SYSTEMS

FIELD OF THE DISCLOSURE

Examples of the present disclosure relate generally to water heating systems and, more specifically, to condensation trays for condensing tankless water heaters that enable combustion gasses to pass through the condensation tray to heat a secondary heat exchanger.

BACKGROUND

A common concern for consumer appliance manufacturers is achieving high efficiency for a manufactured appliance. If the appliance consumes less energy, for example heat from electricity or gas, the overall cost of the appliance over time is decreased by the offset of savings on the utility bill. A recent development to increase the efficiency of water heaters includes the tankless water heater. In contrast to the prior tank designs, which require energy to constantly heat the water even when hot water is not in demand, tankless water heaters heat water only when it is in demand by the consumer. To do this, the water heater includes a heat exchanger that includes coiled water conduits. Heat from a gas burner can heat the water running through the coils, resulting in warm water at the outlet of the tankless water heater.

The tankless water heater also includes issues with efficiency. Once the heated air passes the coiled water conduits in the heat exchanger, the combustion gases can escape via an exhaust flue without fully transferring its heat to the water. To solve this drop in efficiency, the condensing tankless water heater was developed. The condensing tankless water heater includes two separate heat exchangers: a primary heat exchanger that is similar to the heat exchangers in conventional tankless heaters; and a secondary heat exchanger for preheating water that has not yet reached the primary heat exchanger using combustion gases that have already passed the primary heat exchanger.

While an improvement over previous designs, condensing tankless water heater also cannot achieve optimal efficiency due to shortcomings in current heater designs. As the coils are heated in the secondary heat exchanger, condensate can form on the coils, which can then drip downwardly. This can be problematic, particularly when the primary heat exchanger is located below the secondary heat exchanger, which can be an otherwise advantageous design choice for decreasing the overall volume of the condensing tankless water heater, for example. To avoid corrosion of the coils in the primary heat exchanger, the bottom surface of the secondary heat exchanger is typically closed to pool condensate, and, therefore, the combustion gases can enter only from a single inlet to the secondary heat exchanger (see, e.g., FIG. 1B). To this end, heat from the combustion gases can be wasted, as even heat transfer is not provided across all coils in the secondary heat exchanger. What is needed, therefore, is a system that can control condensate run off and increase the efficiency of air flow across the secondary heat exchanger.

BRIEF SUMMARY

These and other problems can be addressed by the technologies described herein. Examples of the present disclosure relate generally to water heating systems and, more specifically, to condensation trays for condensing tankless water heaters that enable combustion gasses to pass through the condensation tray to heat a secondary heat exchanger.

The present disclosure provides a condensation tray. The tray can simultaneously (1) permit combustion gasses to pass from a first side of the condensation tray to a second side of the condensation tray and (2) collect condensate from the second side of the condensation tray. The tray can include a plurality of peaks. Each peak can include an upper ridge that can divert condensate, a first overhang extending in a first direction from the upper ridge, and a second overhang extending in a second direction from the upper ridge. The tray can include a plurality of valleys laterally offset from the plurality of peaks. Each valley can include (i) a lower trough along the first side of the condensation tray that can divert the combustion gasses into gas channels formed by adjacent valleys, and (ii) a reservoir disposed along the second side of the condensation tray. The tray can also include one or more gas apertures. The gas apertures can be positioned proximate at least one of the first overhang or the second overhang.

The gas apertures can be placed on the underside of one or more of the overhangs. For example, the overhangs can include underhangs along the bottom of the overhangs, and the gas apertures can be placed on the underhangs. The underhangs can face toward the valleys so as to inhibit condensate flow into the gas apertures.

The first side of the tray, which can be positioned toward a primary heat exchanger, can be coated with an insulative coating so as to dissipate heat from the heated combustion gases. This insulative coating can help prevent condensation from forming on the bottom of the tray, thereby preventing condensate from leaking onto the primary heat exchanger. In other examples, the entire tray can be made of an insulative material to prevent condensation.

The valleys of the tray can be slanted, i.e., one side is deeper than the other side, so as to divert condensate runoff to one end of the tray so that it can be drained. Alternatively, the entire tray can be slanted for draining.

Another aspect of the present disclosure provides a condensation tray having a length and a width. The tray can include a plurality of valleys positioned along the width of the condensation tray and extending at least partially along the length of the condensation tray. A first side of each of the valleys can channel air flow to one or more gas apertures, and a second side of each of the plurality of valleys can pool condensate. The tray can include a plurality of peaks alternating laterally with the plurality of valleys. The peaks can be positioned along the width of the condensation tray and can extend at least partially along the length of the condensation tray. Each peak can divert the condensate into one or more valley. The tray can include one or more gas apertures positioned proximate at least one of the plurality of peaks.

The peaks can include an upper ridge that diverts the condensate. A first overhang can extend from each upper ridge along the width of the tray and at least partially cover an adjacent valley. The one or more of the gas apertures can be positioned on an underhang that corresponds to one overhang. The underhang can be positioned such that it faces a corresponding valley.

The peaks can include an upper ridge that diverts the condensate. A first overhang can extend from each upper ridge along the width of the tray and at least partially cover one of the adjacent valleys. A second overhang can extend from each upper ridge along the width of the tray in an opposite direction of the first overhang. Both the first and second overhangs of each peak can include an underhang, and one or more gas apertures can be placed on an underhang.

The gas apertures can extend substantially the entire length of the tray. In other examples, each peak can include a plurality of apertures extending along the length of the tray. The one or more of the gas apertures can be positioned on an underhang that corresponds to an overhang. The underhang can be positioned such that it faces a corresponding valley.

A first side of the tray, which can be positioned toward a primary heat exchanger, can be coated with an insulative coating so as to dissipate heat from the heated combustion gases. This insulative coating can help prevent condensation from forming on the bottom of the tray, thereby preventing condensate from leaking onto the primary heat exchanger. In other examples, the entire tray can be made of an insulative material to prevent condensation.

The valleys of the tray can be slanted, i.e., one side is deeper than the other side, so as to divert condensate runoff to one end of the tray so that it can be drained. Alternatively, the entire tray can be slanted for draining.

Another aspect of the present disclosure provides a water heating system. The system can include a primary heat exchanger and a secondary heat exchanger. The system can include a condensation tray positioned between the primary heat exchanger and the secondary heat exchanger. The tray can enable combustion gases to pass from a first side of the condensation tray to a second side of the condensation tray. The tray can include a plurality of valleys disposed along a width of the condensation tray and extending at least partially along a length of the condensation tray. The second side of each of the plurality of valleys can pool condensate, and the first side of each of the plurality of valleys can channel air flow to one or more gas apertures. The tray can include a plurality of peaks alternating with the plurality of valleys, the plurality of peaks disposed along the width of the condensation tray and extending at least partially along the length of the condensation tray. Each peak of the plurality of peaks can divert the condensate into one or more valley of the plurality of valleys. The tray can include the one or more gas apertures that are positioned proximate at least one of the plurality of peaks.

The primary heat exchanger can include a first plurality of coils. The secondary heat exchanger can include a second plurality of coils. The first side of each of the plurality of valleys can include positioned toward the primary heat exchanger, and the second side of each of the plurality of valleys can include positioned toward the secondary heat exchanger. A first row of coils in the second plurality of coils can be positioned above the plurality of peaks. A second row of coils in the second plurality of coils can be positioned above the plurality of valleys.

Each peak can include an upper ridge that can divert the condensate from the second plurality of coils. Each peak can include a first overhang extending from the upper ridge in a direction along the width of the condensation tray and at least partially covering a first valley of the plurality of valleys. At least one of the one or more gas apertures can be disposed on an underhang of the first overhang. Additionally, each peak can include a second overhang extending from the upper ridge in an opposite direction from the first overhang. The second overhang can be similar to the first overhang.

The system can further include an outer cabinet directing the combustion gases across the primary heat exchanger, through the condensation tray, and across the secondary heat exchanger. A width of the condensation tray can extend entirely from a first sidewall of the outer cabinet to a second sidewall of the outer cabinet.

These and other aspects of the present disclosure are described in the Detailed Description below and the accompanying figures. Other aspects and features of the present disclosure will become apparent to those of ordinary skill in the art upon reviewing the following description of specific examples of the present disclosure in concert with the figures. While features of the present disclosure may be discussed relative to certain examples and figures, all examples of the present disclosure can include one or more of the features discussed herein. Further, while one or more examples may be discussed as having certain advantageous features, one or more of such features may also be used with the various other examples of the disclosure discussed herein. In similar fashion, while examples may be discussed below as devices, systems, or methods, it is to be understood that such examples can be implemented in various devices, systems, and methods of the present disclosure.

BRIEF DESCRIPTION OF THE DRAWINGS

The accompanying drawings, which are incorporated in and constitute a part of this specification, illustrate multiple examples of the presently disclosed subject matter and serve to explain the principles of the presently disclosed subject matter. The drawings are not intended to limit the scope of the presently disclosed subject matter in any manner. In the drawings.

DETAILED DESCRIPTION

Efficiency ratings are a key concern for home appliances, as savings on utility bills can translate to savings on the appliance over time. The search for efficient water heaters is no different, causing manufacturers to develop new systems to decrease the overall cost to the consumer. Traditional water heaters include tanks that hold water heated to a desired temperature. When hot water (also referenced as heated water) is in demand, the hot water reserve from the tank is sent to the faucet, and the water heater again heats the tank to the desired temperature when new, cold water enters the tank. This is an inherently inefficient process, as the water must be heated even if the water is not in demand.

Figure 1A:
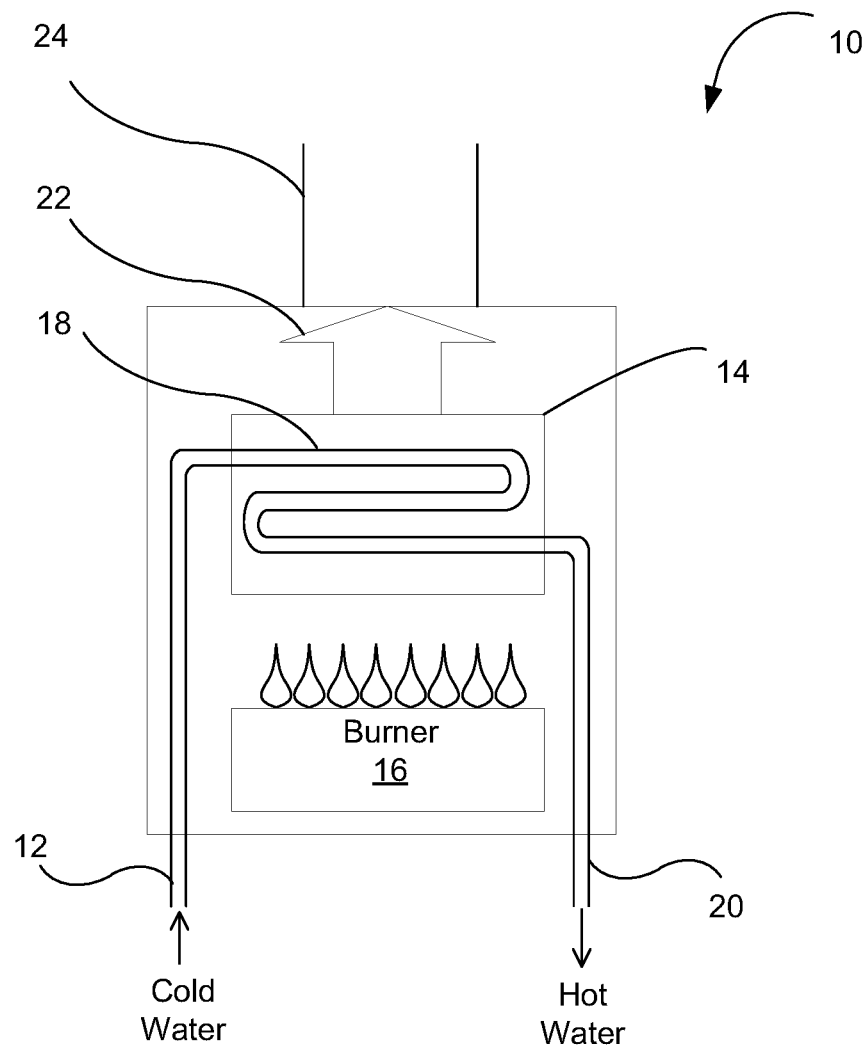
FIG. 1A depicts a prior art conventional tankless water heater.

A previous solution to this design is the conventional tankless water heater. A schematic of the design of the tankless water heater 10 can be seen in FIG. 1A. A cold-water inlet 12 provides cold water to the tankless water heater 10. The cold water is then sent to a heat exchanger 14, where heat from a burner 16 warms coils 18 within the heat exchanger 14. In this design, only the water that passes through the heat exchanger 14 is heated, thereby avoiding the tank-concept that requires continuous storage of hot water. After the water is heated in the heat exchanger 14, the hot water exits the tankless water heater 10 via a hot-water outlet 20. The excess combustion gases 22 that pass through the heat exchanger 14 exit the system via an exhaust flue 24.

Although this design is more efficient than water heaters with tanks, there is an inherent inefficiency in that the combustions gases 22, which can remain well over 300° F. after passing the heat exchanger 14, merely exit the system without realizing full heat transfer to the water. Because of this, conventional tankless water heaters 10 usually have a heat-transfer efficiency in the low 80% range.

To help solve the problem of wasted heat, the condensing tankless water heater was developed. A schematic of the design of a prior art condensing tankless water heater 50 can be seen in FIG. 1B. A cold-water inlet 52 provides cold water to the condensing tankless water heater 50. The cold water passes to a secondary heat exchanger 54, which is downstream in terms of air flow from a primary heat exchanger 56. After the combustion gases from the burner 58 pass the primary heat exchanger 56, the combustion gases are sent to the secondary heat exchanger 54. The excess heat from the combustion gases heat secondary coils 60 in the secondary heat exchanger 54, thereby preheating the water that will then travel though the conduit to the primary heat exchanger 56. The primary coils 62 in the primary heat exchanger 56 are heated by the burner 58 in a manner similar to the conventional tankless water heater 10, and hot water exists the condensing tankless water heater 50 via a hot-water outlet 64. The benefit of this design is that the combustion gases that pass through the primary heat exchanger 56 do not immediately leave the system via the exhaust flue 66, but are instead used to pre-heat the water before it enters the primary heat exchanger 56. This results in a heat-exchange efficiency in the high 90% range.

One byproduct of this design is that the secondary coils 60, which include cool water, condensate as the combustion gases pass the coils. If the condensate, which can be significantly acidic, falls on the primary coils 62, then the coils can corrode. To stop the condensate from interacting with the primary coils 62, condensate run-off is channeled by a bottom surface of the secondary heat exchanger 54 that acts as a condensate drain path 68. The condensate drain path 68 can be slightly sloped to a condensate outlet 70 that enables the condensate to be removed from the system.

Figure 1B:
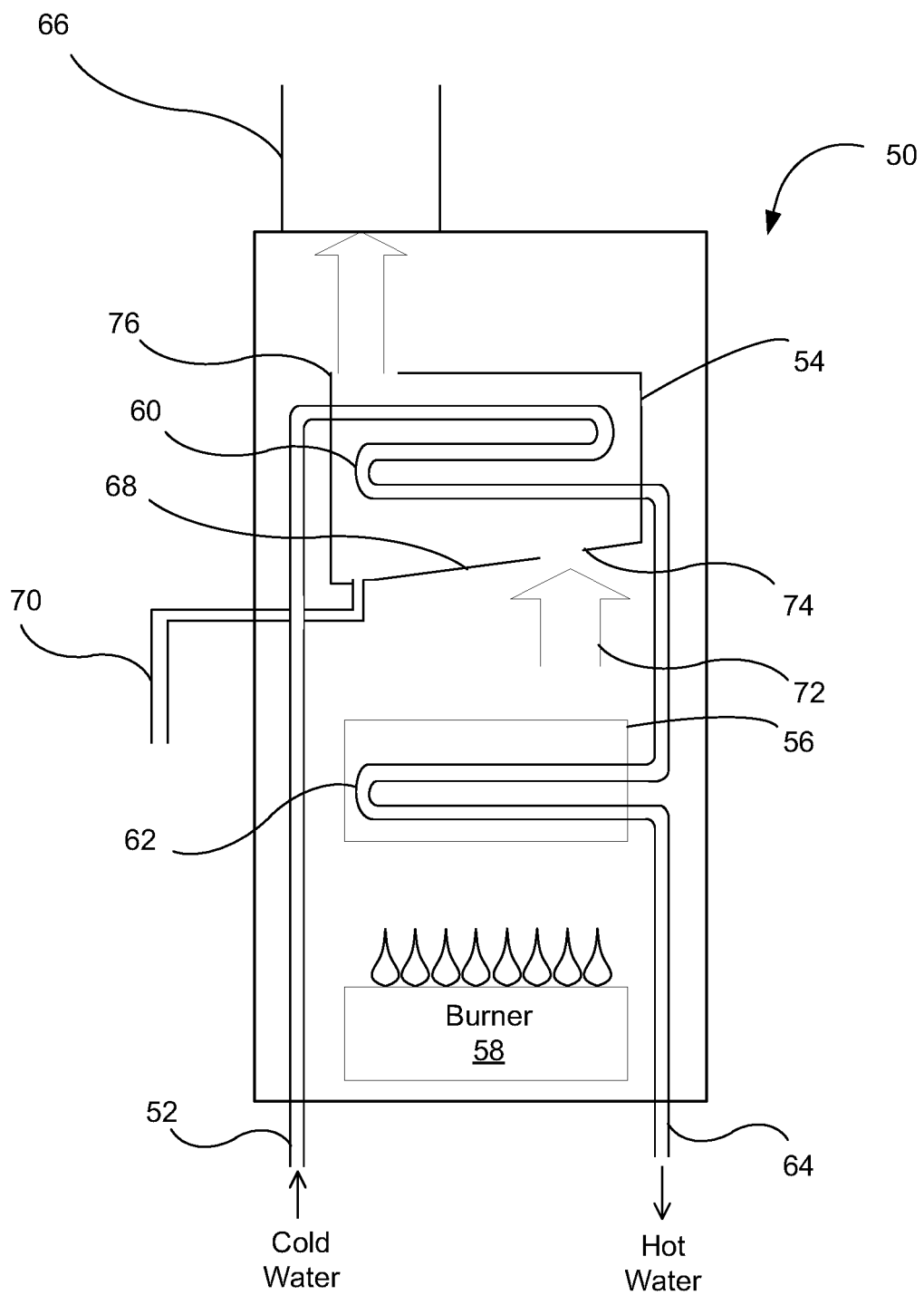
FIG. 1B depicts a prior art condensing tankless water heater.

An issue with the bottom surface of the secondary heat exchanger 54 being closed to create the condensate drain path 68 is that the combustion gases 72 from the primary heat exchanger 56 must enter the secondary heat exchanger 54 at only certain locations, or more typically, a single location. A combustion gas inlet 74, which is an opening in the secondary heat exchanger 54, can be positioned at an opening in the bottom surface (as shown in FIG. 1B) or on the side of the secondary heat exchanger 54, thereby avoiding the condensate drain path 68. The combustion gases 72 pass across the secondary coils 60, exit the secondary heat exchanger 54 at a combustion gas outlet 76, and the combustion gases 72 from the secondary heat exchanger 54 exit via an exhaust flue 66.

Preventing the combustion gases 72 from passing through the entire secondary heat exchanger 54 can cause a number of inefficiencies. Since the entire bottom of the secondary heat exchanger 54 can be covered by the condensate drain path 68, the combustion gases may take a longer path thorough the heat exchanger, which can decrease the air-side head loss and heat transfer can be wasted. Also, by having a single inlet (i.e., combustion gas inlet 74) and a single outlet (i.e., combustion gas outlet 76), certain areas of the secondary heat exchanger 54 (e.g., certain secondary coils 60) may not receive as much heat as other areas of the heat exchanger. Another inefficiency is the overall constriction of air flow around the secondary heat exchanger 54.

Certain solutions are available for these inefficiencies. First, a larger primary heat exchanger 56 can be used to further heat the water. This is, of course, not optimal, as the solution can both increase the cost of the unit and increase the size of the unit to accommodate the increased amount of air flow necessary to pass the combustion gasses through the primary heat exchanger 56. Second, a larger blower can be provided to move more combustion gas through the system. This also can increase the cost of the appliance and, therefore, inhibit the adoption of the system.

What is needed, therefore, is a design for a condensing tankless water heater that improves the efficiency of the system by increasing the combustion gas flow around the secondary heat exchanger and across the secondary coils. To achieve this, the present disclosure describes condensation trays for condensing tankless water heaters that enable combustion gasses to pass through the condensation tray to heat a secondary heat exchanger. Instead of a solid base surface that defines the condensate drain path 68, as shown in FIG. 1B, the present designs include condensation trays that both capture condensate and enable combustion gasses to pass directly to the secondary heat exchanger (e.g., across all or substantially all of the width and/or depth of the secondary heat exchanger). The designs can reduce the length of the path that the combustion gasses must travel, decreasing the air-side head loss and wasted heat transfer. The designs can also reduce the power required for a fan pushing the combustion gasses across the heat exchangers. Additionally, the designs can increase the contact surface area of the combustion gasses with the water coils, causing an increase in heat transfer performance. Various systems are disclosed water heaters and condensation trays for condensing tankless water heaters, and example systems will now be described with reference to the accompanying figures.

Figure 2A:
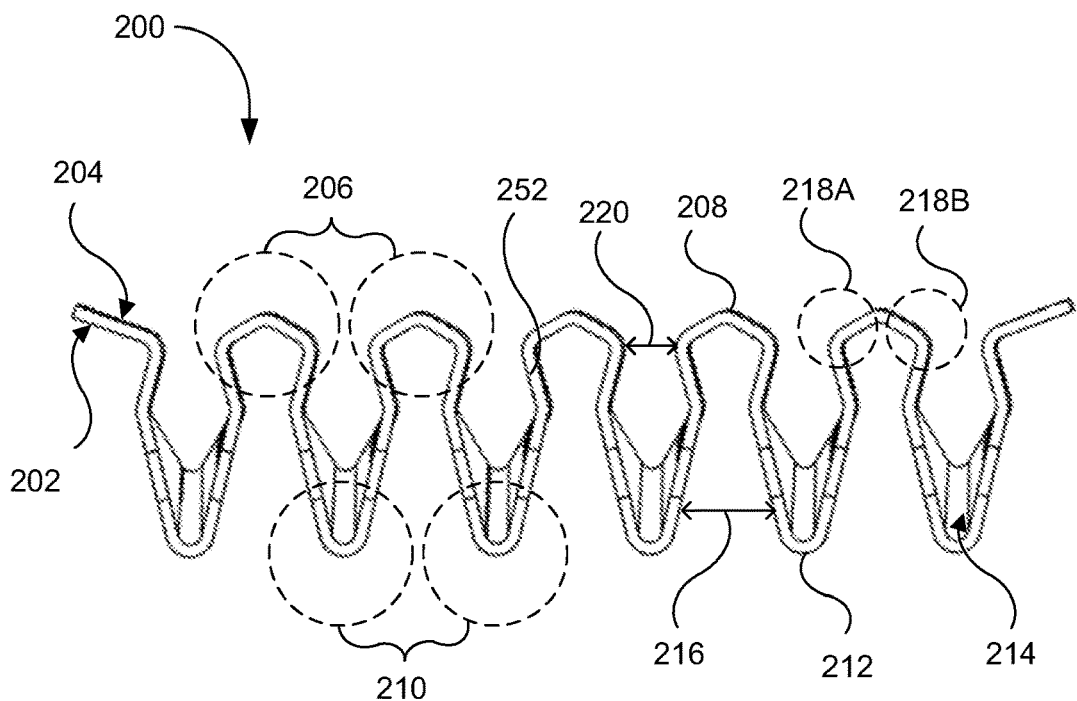
FIGS. 2A-2D depict example condensation trays for a tankless water heater, according to the present disclosure.

FIGS. 2A-2D depict example condensation trays 200 for a tankless water heater. FIG. 2A is a front view of a tray 200. The tray 200 can include a first side 202 that can be positioned toward a primary heat exchanger, and a second side 204 that can be positioned toward a secondary heat exchanger. The combustion gases can flow from the first side 202 to the second side 204 of the tray 200.

The tray 200 can include a plurality of peaks 206. Each of the peaks 206 can include an upper ridge 208 that can divert condensate that drips from the secondary heat exchanger positioned above the peaks 206. Each upper ridge 208 can be formed by two angled surfaces, and the angled surfaces can be substantially flat. The tray 200 can include a plurality of valleys 210. The valleys 210 can alternate laterally with respect to the peaks 206. Each valley 210 can include a lower trough 212. The lower trough(s) 212 can be positioned along the first side 202 of the tray 200. The opposite side of each valley 210 (the side along the second side 204 of the tray) can define a reservoir 214 that can accept the runoff of the condensate from the peaks 206. A gap or distance between each valley 210 (on the first side 202) can define a gas channel 216. As the combustion gas passes the primary heat exchanger and approaches the tray 200, the valleys 210 can direct the combustion gasses into the gas channel(s) 216. The gas channels 216 can then channel the combustion gasses toward the peaks 206.

Referring again to the plurality of peaks 206, each peak 206 can include one or more overhangs 218, for example a first overhang 218A and a second overhang 218B. The first overhang 218A can extend in a first direction from a single upper ridge 208, and the second overhang 218B can extend in a second direction from the single upper ridge 208. The first direction can be downward (i.e., from the upper ridge 208 on the second side 204 and toward the first side) and in a first lateral direction, and the second direction can be downward and in a second lateral directions that is generally opposite the first lateral direction. Each overhang 218 can extend at least partially over the reservoir 214 of an adjacent valley 210 to facilitate condensate being diverted into the reservoir 214. A gap or distance between an overhang 218 of a first peak 206 and an adjacent overhang 218 of a second peak 206 can define a fluid channel 220 for allowing the condensate to pass into the valleys 210. Although FIG. 2A depicts a tray 200 having two overhangs (e.g., first overhang 218A and second overhang 218B) extending from each upper ridge, it is also contemplated that any peak 206 may include only one overhang 218. For example, a first overhang (shown as first overhang 218A in FIG. 2A) can extend from an upper ridge 208 in a first direction, while no overhang extends in the other direction, meaning the tray 200 can slope in a straight line from the upper ridge 208 to the lower trough 212 on that side of the peak 206.

Figure 2B:
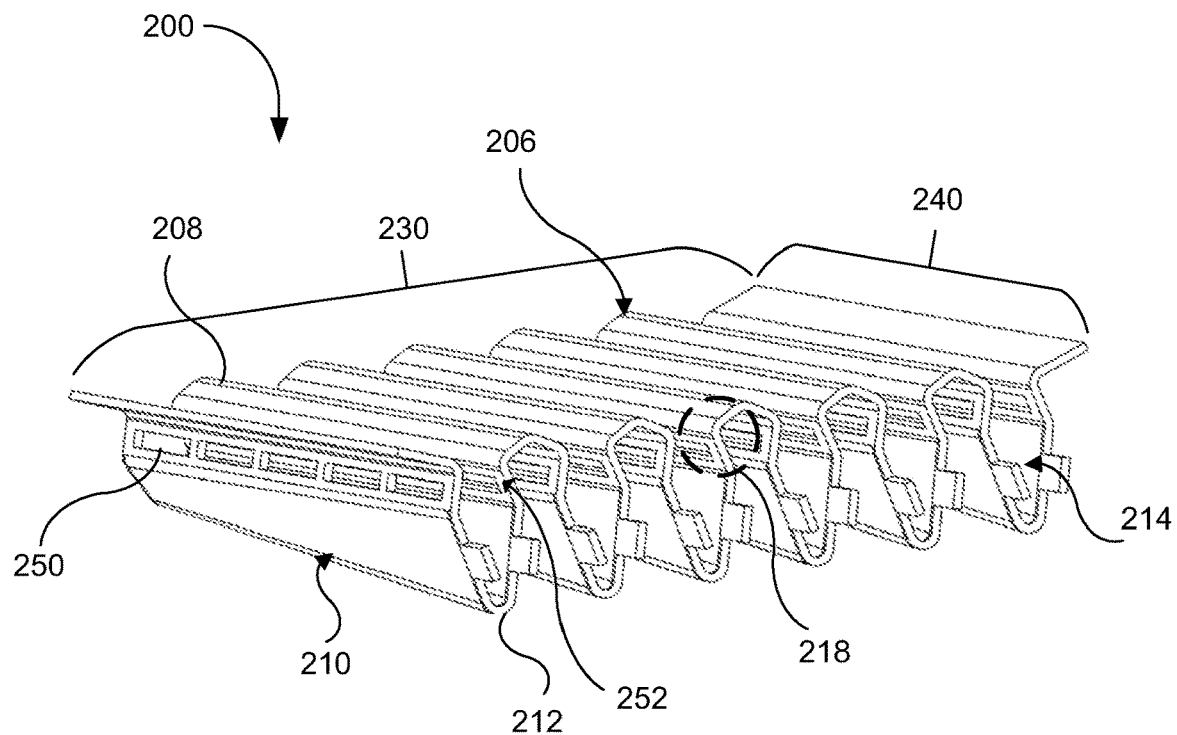

FIG. 2B is a perspective view of an example tray 200. The tray 200 can have a width 230. The series of alternating peaks 206 and valleys 210 can extend along all, or substantially all, of the width 230 of the tray 200, as shown. The tray 200 can have a length 240. The peaks 206 and valleys 210 can extend across all, or substantially all, of the length 240 of the tray 200. Optionally, the reservoirs 214 of the valleys 210 can be sloped along the length 240 of the tray 200 so as to allow the condensate that has pooled to flow from the tray 200. This design is discussed in greater detail below.

A tray 200 can include one or more gas apertures 250. The gas apertures 250 can be positioned proximate one or more of the peaks 206. As described above, a benefit of the present design is the ability to simultaneously (1) permit combustion gasses to pass from a first side 202 of the condensation tray 200 to a second side 204 of the condensation tray 200 and (2) collect condensate from the second side 204 of the condensation tray. The gas apertures 250 can enable the flow of combustion gasses through the tray 200. The gas apertures 250 can take many shapes, such as the elongated slots as shown in FIG. 2B or other shapes such as circular or elliptical holes. A plurality of gas apertures 250 can be positioned along the length 240 of the tray 200, as shown. Alternatively or additionally, the gas aperture 250 can be a single cutaway in the tray extending partially or substantially entirely across the length 240 of the tray. The size, shape, and location of the gas aperture(s) 250 can be selected based on the desired flow characteristics of combustion gases passing through the gas apertures 250.

As described above, if the condensate, which can be significantly acidic, falls on the coils of the primary heat exchanger that rests below the tray 200, then corrosion of the coils may occur. To prevent the leakage of the condensate through the tray 200, the gas apertures 250 can be at least partially covered by the one or more overhangs 218. Referring to FIG. 2B for example, the overhangs 218A,218B can extend outwardly from the upper ridge 208 and then curve, slant, or otherwise extend back inwardly, thereby creating an underhang 252. The underhang(s) 252 can be positioned such that each can face toward the valleys 210 (or the reservoirs) and not toward the secondary heat exchanger positioned above the tray 200, i.e., from where the condensate falls. This overhang/underhang combination can enable the condensate to flow freely over the overhangs 218 and into the reservoirs 214, and yet hinder or prevent the condensate from flowing back through the gas apertures 250.

Yet another benefit of the gas apertures 250 is that they can accelerate the combustion gas as it passes into the secondary heat exchanger. As the combustion gas accelerates through the gas apertures 250, the higher-velocity heat can increase the heat transfer around the secondary heat exchanger, meaning a smaller heat exchanger (i.e., fewer coils/tubes) may be needed to sufficiently preheat the water therein. When reference is made herein to "coils," it will be understood to mean that individual tubes of the heat exchanger can be represented by a single tube that can be bent a plurality of times to increase the surface area of the heat exchanger, or the term "coils" can equally be defined as a plurality of tubes that can increase the surface area of the heat exchanger.

Figure 2C:
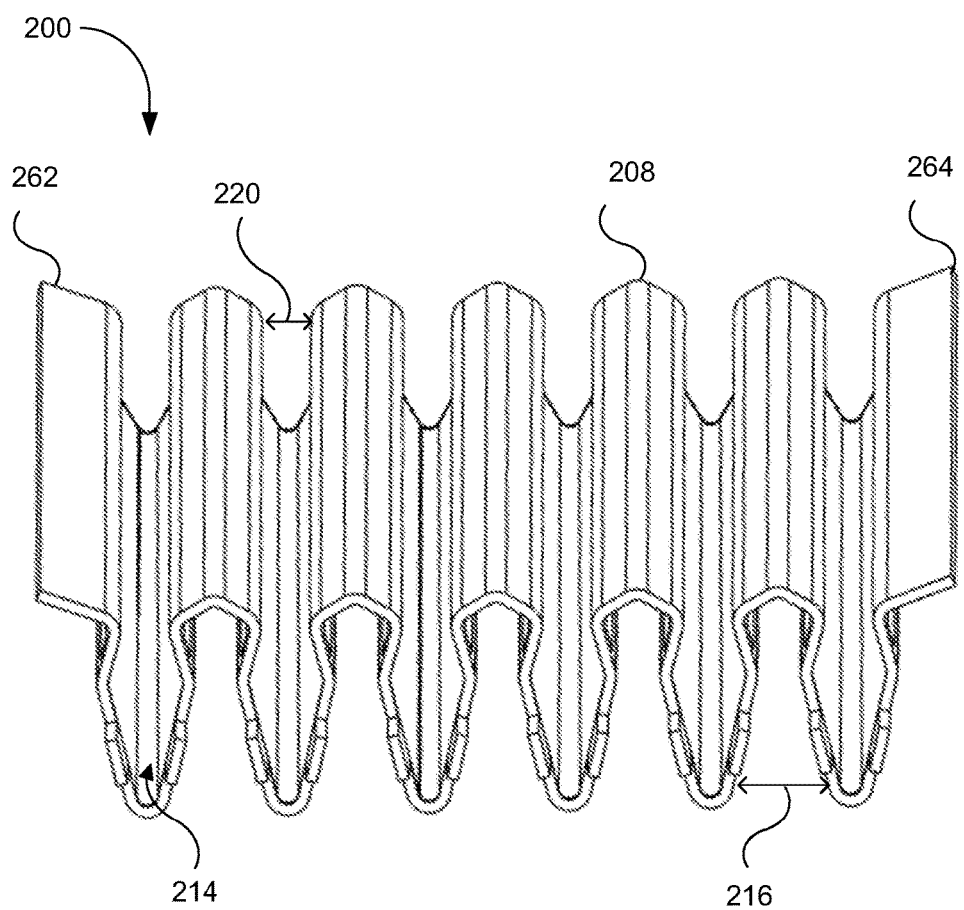

FIG. 2C is an upper perspective view of an example tray 200. The trays 200 described herein can include end flanges at each edge of the tray 200. For example, a first end flange 262 can be positioned at one end of the alternating peaks/valleys, while a second end flange 264 can be positioned at the other end of the peaks/valleys. These end flanges can be slanted to ensure that condensate properly drains into the first valley 210 at each end of the tray 200. As will be described in greater detail below, the first end flange 262 and second end flange 264 can also be positioned to abut a cabinet (e.g., cabinet 312 below) so as to prevent combustion gasses from passing the sides of the tray 200, which can improve heating performance.

Figure 2D:
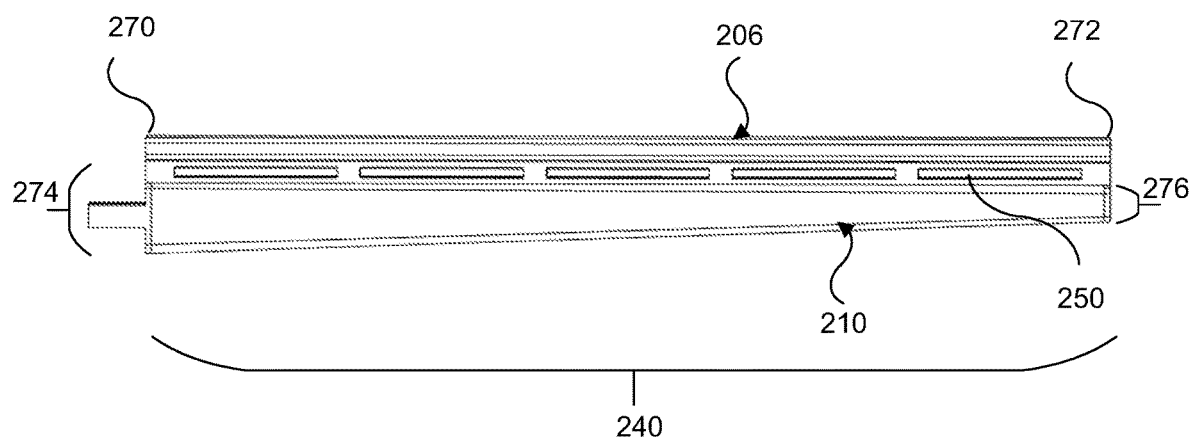

FIG. 2D is a side view of an example tray 200. The length 240 of the tray 200 can be defined by a first end 270 at one end of the tray 200 and a second end 272 at the other end of the tray 200. Since the tray 200 is designed to drain the condensate from the system, it is contemplated that the tray 200 can be angled to facilitate the drainage. In one aspect, this drainage can be facilitated by a change in depth of the valleys 210 from the first end 270 to the second end 272. For example, each valley 210 can be slanted along the length 240 of the tray 200 such that a first depth 274 of the valleys 210 at the first end 270 is deeper than a second depth 276 of the valleys 210 at the second end 272. Alternatively, or in addition, the entire tray 200 can be tilted at an angle so as to allow the condensate to drain to one end of the tray 200 (e.g., the first end 270 or the second end 272).

Figure 3A:
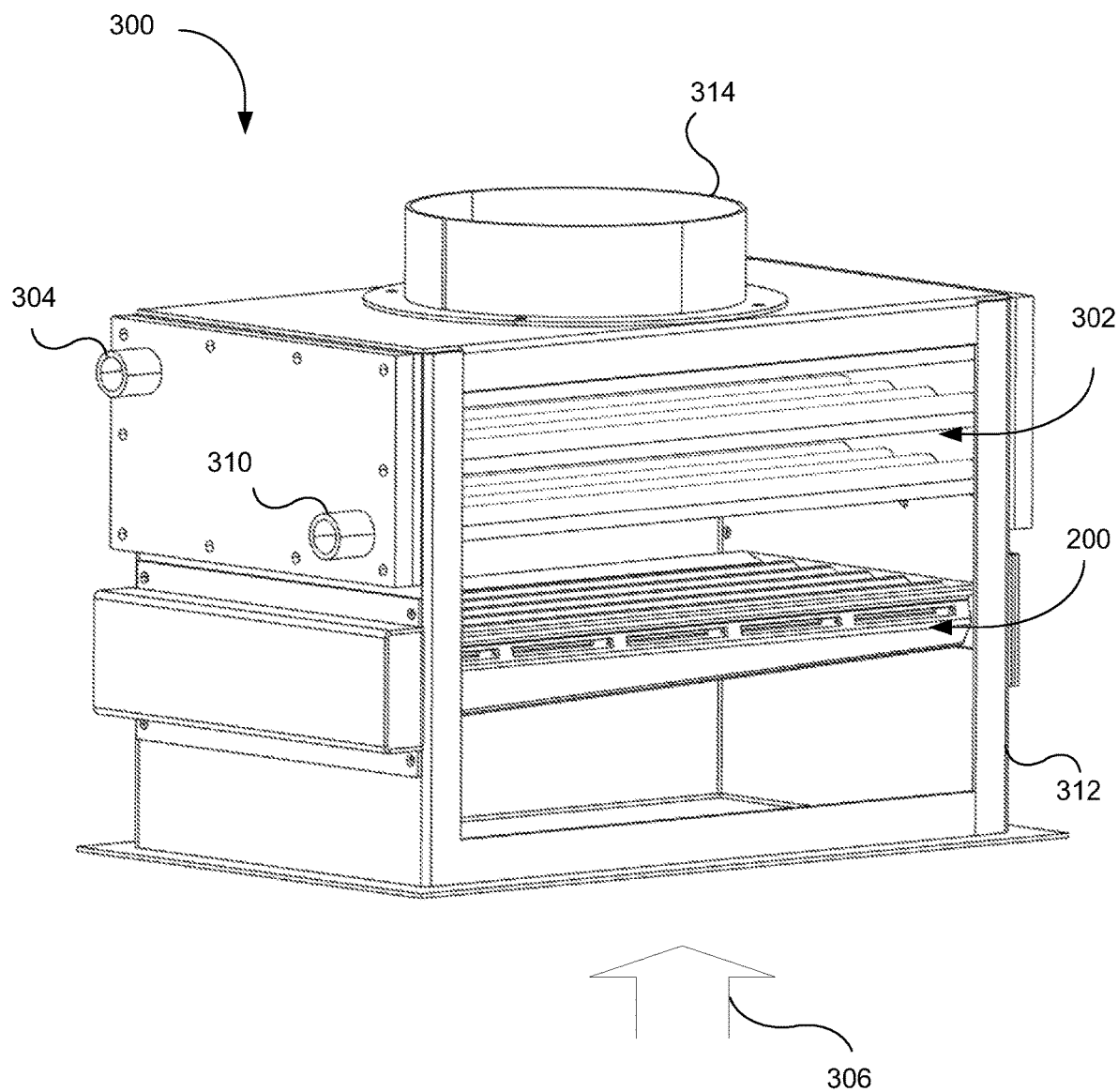
FIGS. 3A-3C depict example condensation trays within a water heater system, according to the present disclosure.
Figure 3B:
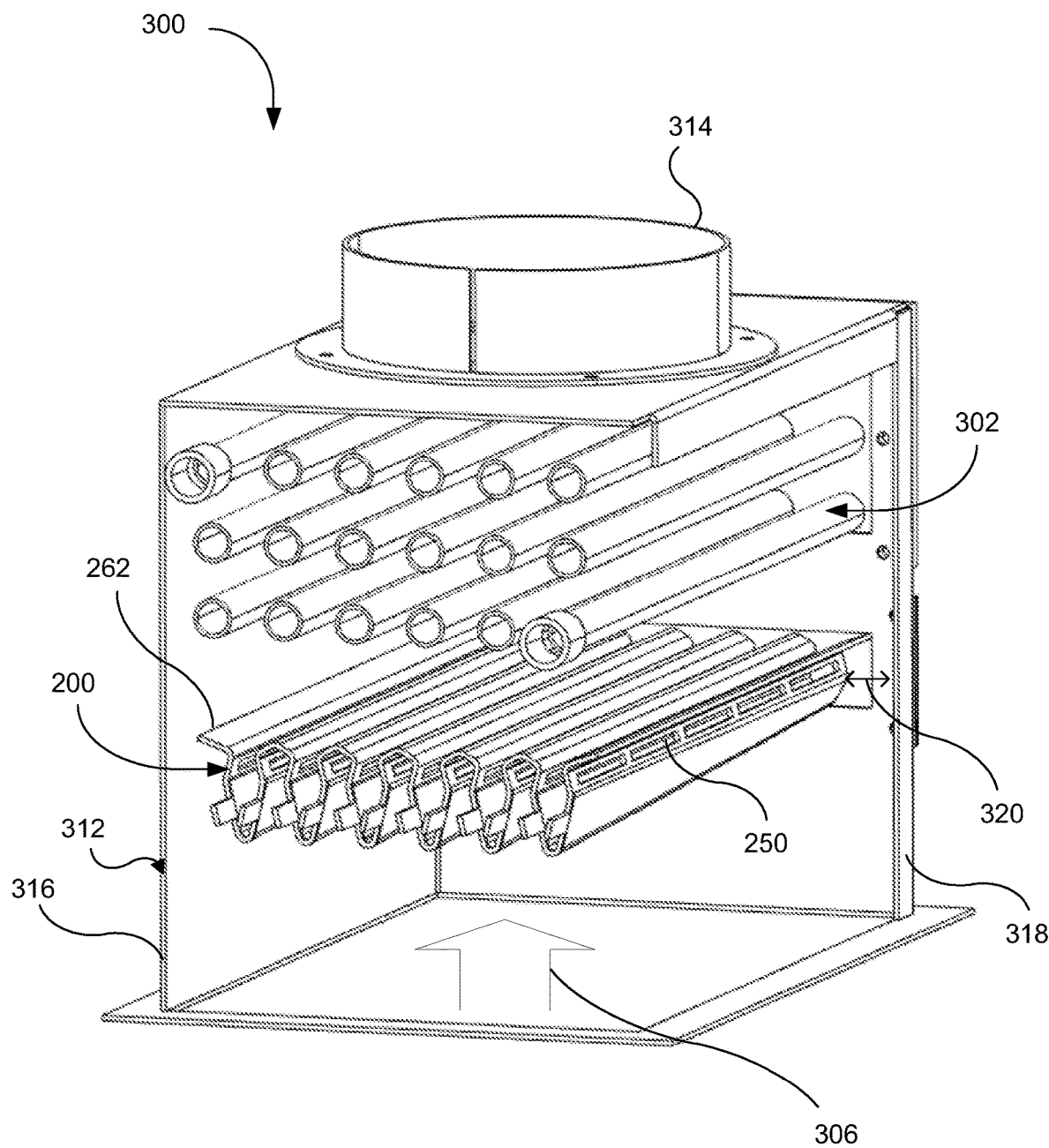
Figure 3C:
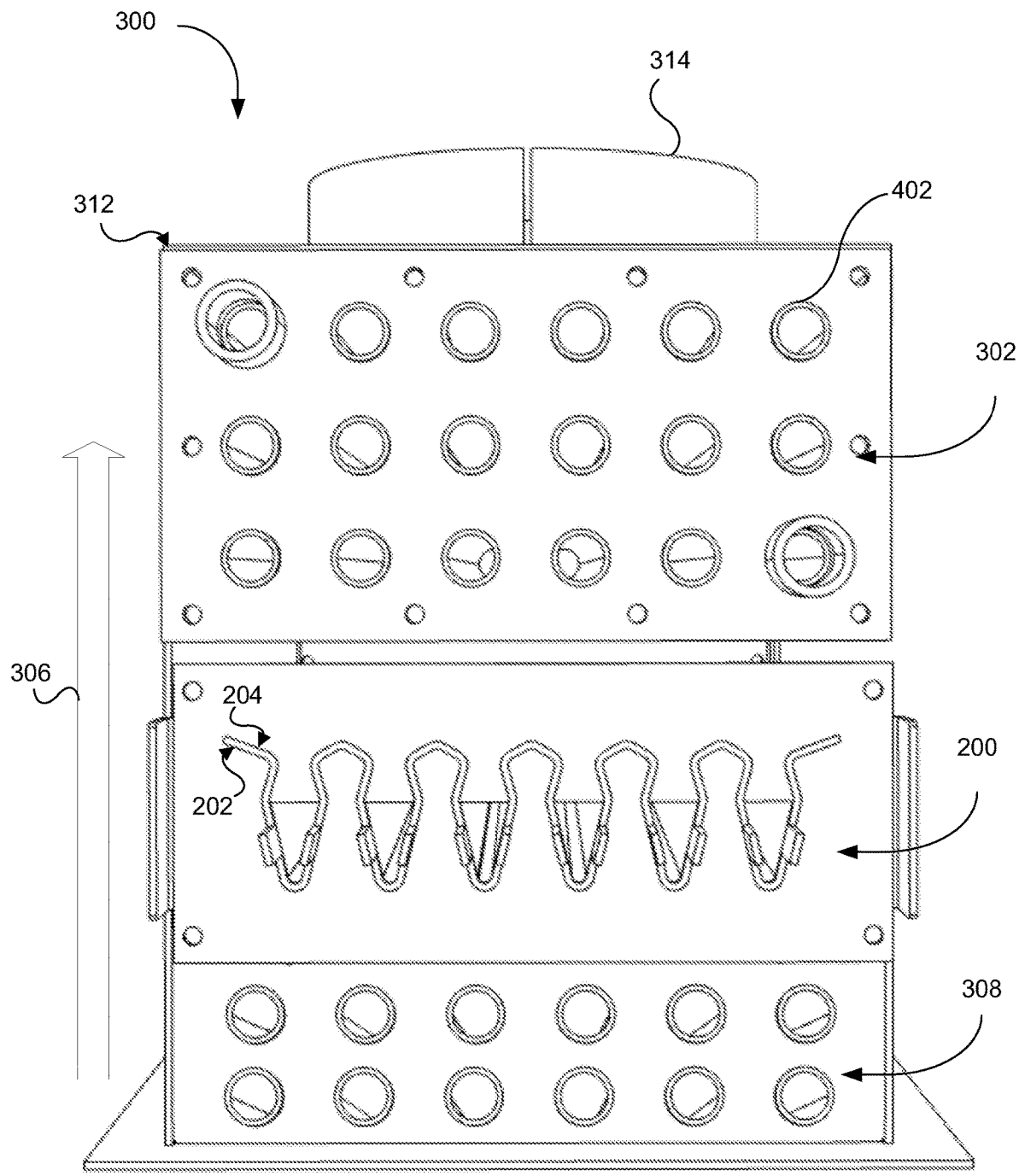

As described throughout this disclosure, the condensation trays 200 described herein can be used inside of a condensing tankless water heater system. FIGS. 3A-3C depict trays 200 within a water heater system 300. FIG. 3A is a perspective view of the water heater system 300. The tray 200 can be positioned below a secondary heat exchanger 302. As cold water enters the secondary heat exchanger 302 from a cold water inlet 304, the water can be heated by the combustion gas flow 306 that has passed the primary heat exchanger 308 (shown in FIG. 3C) and flowed through the tray 200. After the water is heated in the secondary heat exchanger 302, warm or preheated water exits a warm water outlet 310. The warm water can then travel to the primary heat exchanger 308 to be further heated.

One or more of the tray 200, secondary heat exchanger 302, and primary heat exchanger 308 (as shown in FIG. 3C) can be positioned within a cabinet 312 so as to direct the combustion gas flow 306 through/around the components. The top of the cabinet 312 can include an exhaust vent 314 that allows the exhaust to exit the water heater system 300.

FIG. 3B is a perspective view of the water heater system 300 with portions of the cabinet 312 removed to provide a view of the internal components of the system. The tray 200 can be positioned within the cabinet 312 at a location between a first sidewall 316 and a second sidewall 318 of the cabinet 312. In some examples, a gap 320 may exist between the sides (e.g., the first end flange 262 and/or the second end flange 264) of the tray 200 and the sidewalls 316,318. The gap 320 can enable the combustion gas flow 306 to pass on the sides of the tray 200 as it enters the space of the cabinet containing the secondary heat exchanger 302.

Alternatively, the gap 320 is not present, and the tray 200 can extend entirely from the first sidewall 316 and a second sidewall 318 of the cabinet 312. Alternatively or additionally, the tray can extend entirely between opposing sidewalls extending between the first and second sidewalls 316,318. Extending the tray 200 across the entirety of the cross sectional surface area of the cabinet 312 can force the combustion gas flow 306 through the gas apertures 250. As stated above, the gas apertures 250 provide the advantage of accelerating the combustion gas flow 306 across the secondary heat exchanger 302, thereby improving heat transfer. Modelling has shown that, for some water heater systems 100, including a tray 200 that extended from the first sidewall 316 to the second sidewall 318 can provide an increase of heat transfer performance compared to a system with a gap 320. Again, although the gap 320 may be present, the gap 320 is not necessary for combustion gas flow 306, as the tray 200 design enables flow over the entirety of the secondary heat exchanger 302, unlike in prior art designs.

FIG. 3C is a front perspective view of a water heater system 300 and depicts an example placement of a primary heat exchanger 308 within a cabinet 312. A burner (not shown in FIG. 3C) can be placed below the primary heat exchanger 308 in the figure, and the combustion gas flow 306 can pass around the primary heat exchanger 308, through the tray 200, and around the secondary heat exchanger 302 before exiting the exhaust vent 314. A benefit of the design of the presently described tray 200 is that the combustion gasses can flow over a majority of the coils 402 of the secondary heat exchanger 302. Unlike prior art designs for condensing tankless water heaters, as described above with reference to FIG. 1B, the present designs are not limited to a single combustion gas inlet/outlet that restricts flow across the coils 402. The single inlet/outlet in prior designs created a longer travel path for the combustion gasses and created a large degree of heat distribution across the secondary heat exchanger. In contrast, the present design provides multiple flow inlets (i.e., the plurality of gas apertures 250), thereby reducing the path the combustion gasses must travel and improving uniform distribution. The designs can also reduce the power required for a fan pushing the combustion gasses across the heat exchangers. Additionally, the designs can increase the contact surface area of the combustion gasses across the water coils 402, providing an increase in heat transfer performance. This means that the size/rating of the primary heat exchanger 308 can be reduced, as the water is heated to a greater degree by the secondary heat exchanger 302.

The tray 200 can include additional features to prevent condensate from falling on the primary heat exchanger 308. For example, as cool condensate drips onto the tray 200, the tray 200 itself may be at risk of condensation as the heated gases pass through the tray 200. Accordingly, the first side 202 of the tray 200, which can be positioned toward a primary heat exchanger 308, can be coated with an insulative coating so as to dissipate heat from the heated gas. The insulative coating can help prevent condensation from forming on the bottom of the tray 200, thereby preventing condensate from leaking onto the primary heat exchanger 308. The insulative coating can include, for example, a polymer coating, a ceramic coating, an insulative paint, and the like. Additionally or alternatively, some or all of the tray 200 itself can be made of an insulative material to prevent condensation. For example, the tray 200 can be manufactured from a plastic, a ceramic, or any other insulative material.

Figure 4A:
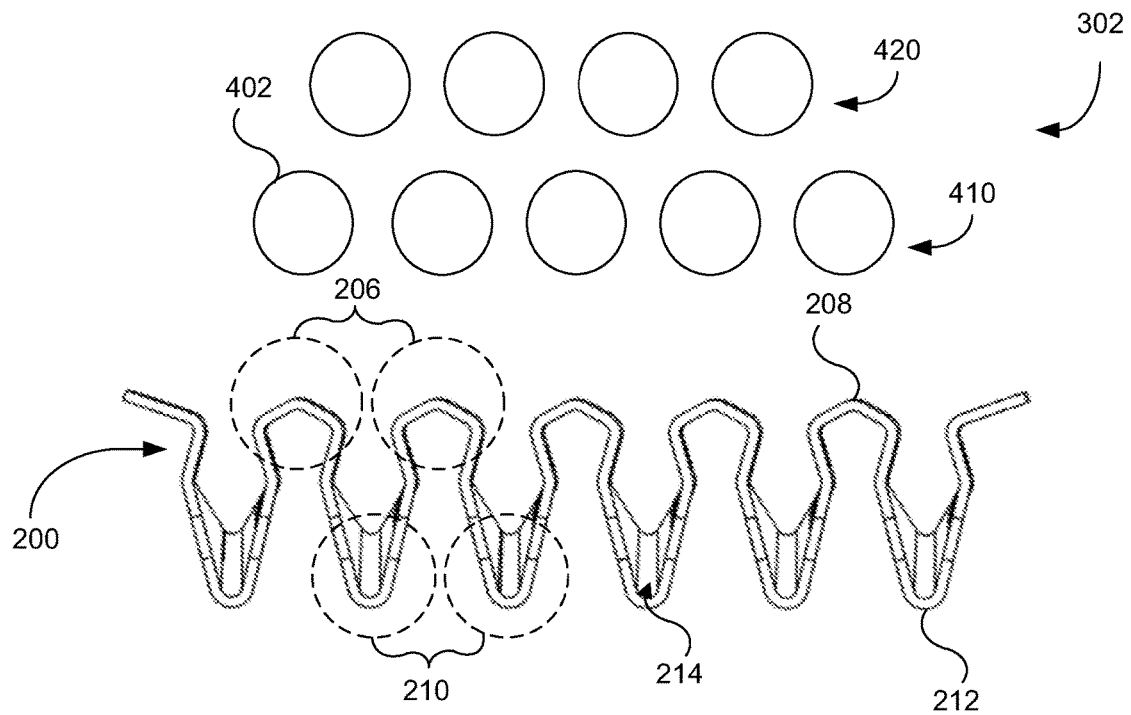
FIGS. 4A and 4B are front views of example placement locations for condensation trays under coils of a secondary heat exchanger, according to the present disclosure.
Figure 4B:
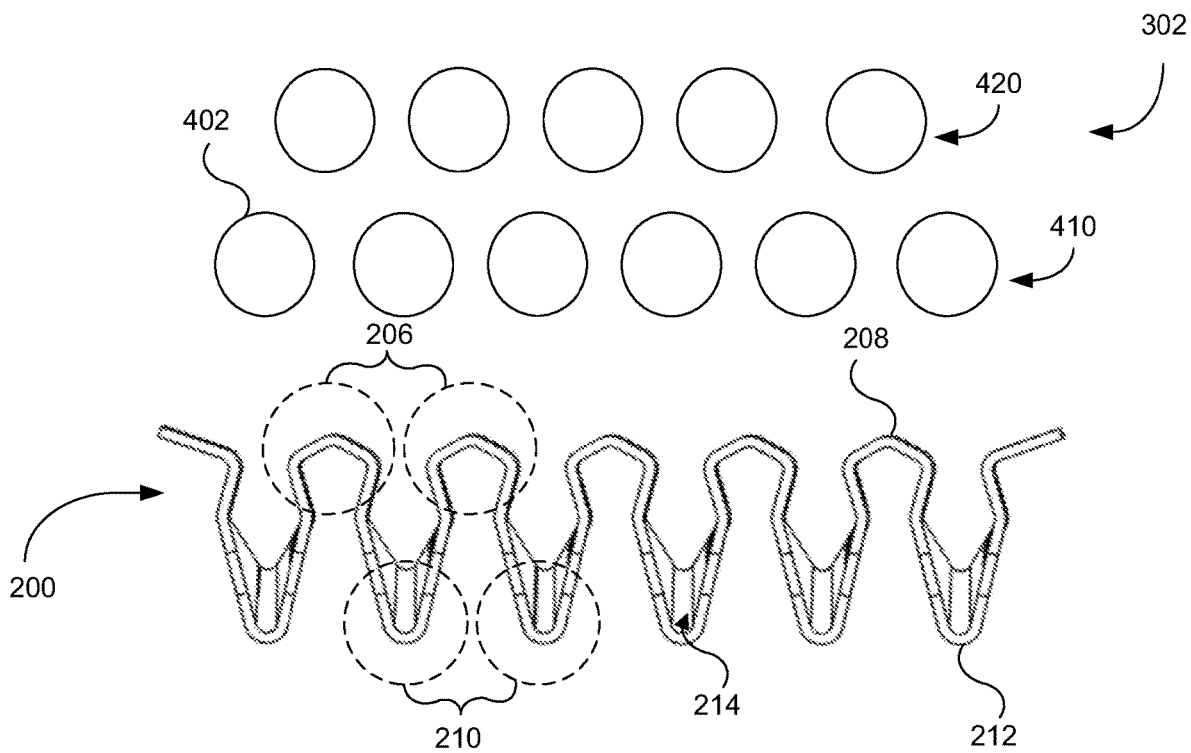

FIGS. 4A and 4B are front views of example placement locations for condensation trays 200 under coils 402 of a secondary heat exchanger 302. Referring to FIG. 4A, in some systems, the tray 200 can be positioned such that a first row 410 of coils of the secondary heat exchanger 302 is placed to align with the upper ridges 208 of each peak 206. This can direct condensate runoff from the upper ridge 208 and into the reservoirs 214 of the valleys 210. A second row 420 of coils 402, as shown, can be offset laterally from the first row 410 such that runoff from the second row 420 falls onto the first row 410 and is directed to the upper ridges 208. The second row 420 can be positioned such that the coils 402 are positioned over the valleys 210. In this configuration, the first row 410 and second row 420 can be offset laterally the same distance the peaks 206 are offset from the valleys 210.

Alternatively, and as shown in FIG. 4B, the tray 200 can be positioned such that a first row 410 of coils of the secondary heat exchanger 302 is placed to align with the lower troughs 212 of the valleys 210. In this configuration, the runoff of condensate can be directed into the reservoirs 214, and only excess condensate that falls off-path will be drained by the peaks 206. A second row 420 of coils, as shown, can be offset laterally from the first row 410 such that runoff from the second row 420 falls onto the first row 410 and is directed downward to the reservoirs 214. The second row 420 can be positioned such that the coils 402 are positioned over the peaks 206. In this configuration, the first row 410 and second row 420 can be offset laterally the same distance the peaks 206 are offset from the valleys 210.

It should also be noted that, as used in the specification and the appended claims, the singular forms "a," "an," and "the" include plural references unless the context clearly dictates otherwise. References to a composition containing "a" constituent is intended to include other constituents in addition to the one named.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter. Additionally, the components described herein may apply to any other component within the disclosure. Merely discussing a feature or component in relation to one embodiment does not preclude the feature or component from being used or associated with another embodiment.

What is claimed is:

1. A condensation tray configured to simultaneously permit combustion gases to pass from a first side of the condensation tray to a second side of the condensation tray and collect condensate from the second side of the condensation tray, the condensation tray comprising:
    a plurality of peaks, each peak of the plurality of peaks comprising an upper ridge configured to divert condensate, a first overhang extending in a first direction from the upper ridge, and a second overhang extending in a second direction from the upper ridge;
    a plurality of valleys laterally offset from the plurality of peaks, each valley of the plurality of valleys comprising (i) a lower trough along the first side of the condensation tray configured to divert the combustion gases into gas channels formed by adjacent valleys, and (ii) a reservoir disposed along the second side of the condensation tray; and
    one or more gas apertures disposed proximate at least one of the first overhang or the second overhang of each peak of the plurality of peaks.

2. The condensation tray of claim 1, wherein the one or more gas apertures are positioned on an underhang of a respective first overhang or a respective second overhang.

3. The condensation tray of claim 2, wherein the one or more gas apertures are positioned such that they are facing a respective reservoir.

4. The condensation tray of claim 1, wherein the one or more gas apertures includes a plurality of gas apertures disposed along a length of the condensation tray proximate at least one of a respective first overhang or a respective second overhang.

5. The condensation tray of claim 1, wherein the first side comprises an insulative coating.

6. The condensation tray of claim 1, wherein the condensation tray comprises an insulative material including plastic or ceramic.

7. The condensation tray of claim 1, wherein each valley of the plurality of valleys is slanted along a length of the condensation tray such that a first depth of the plurality of valleys at a first end of the condensation tray is deeper than a second depth of the plurality of valleys at a second end of the condensation tray.

8. A condensation tray for a condensing tankless water heater, the condensation tray having a length and a width and comprising:
    a plurality of valleys disposed along the width of the condensation tray and extending at least partially along the length of the condensation tray, a first side of each of the plurality of valleys configured to channel air flow to one or more gas apertures, and a second side of each of the plurality of valleys configured to pool condensate;
    a plurality of peaks alternating laterally with the plurality of valleys, the plurality of peaks disposed along the width of the condensation tray and extending at least partially along the length of the condensation tray, each peak of the plurality of peaks configured to divert the condensate into one or more valley of the plurality of valleys; and
    the one or more gas apertures disposed proximate at least one of the plurality of peaks.

9. The condensation tray of claim 8, wherein each of the plurality of peaks comprises:
    an upper ridge configured to divert the condensate; and
    a first overhang extending from the upper ridge in a direction along the width of the condensation tray and at least partially covering a first valley of the plurality of valleys,
    wherein at least one of the one or more gas apertures is disposed on an underhang of the first overhang.

10. The condensation tray of claim 8, wherein each of the plurality of peaks comprises:
    an upper ridge configured to divert the condensate;
    a first overhang extending from the upper ridge in a first direction along the width of the condensation tray and at least partially covering a first valley of the plurality of valleys; and
    a second overhang extending from the upper ridge in a second direction along the width of the condensation tray and at least partially covering a second valley of the plurality of valleys,
    wherein a first gas aperture is disposed on a first underhang of the first overhang, and
    wherein a second gas aperture is disposed on a second underhang of the second overhang.

11. The condensation tray of claim 10, wherein:
    the first gas aperture is one of a first plurality of gas apertures extending from a first end of the condensation tray to a second end of the condensation tray along the length of the condensation tray; and
    the second gas aperture is one of a second plurality of gas apertures extending from the first end of the condensation tray to the second end of the condensation tray along the length of the condensation tray.

12. The condensation tray of claim 8, wherein the first side of each of the plurality of valleys comprises an insulative coating.

13. The condensation tray of claim 8, wherein the condensation tray comprises an insulative material including plastic or ceramic.

14. The condensation tray of claim 8, wherein each valley of the plurality of valleys is slanted along the length of the condensation tray such that a first depth of the plurality of valleys at a first end of the condensation tray is deeper than a second depth of the plurality of valleys at a second end of the condensation tray.

15. A water heater system comprising:
    a primary heat exchanger;
    a secondary heat exchanger; and a condensation tray positioned between the primary heat exchanger and the secondary heat exchanger and configured to enable combustion gases to pass from a first side of the condensation tray to a second side of the condensation tray, the condensation tray comprising:
- a plurality of valleys disposed along a width of the condensation tray and extending at least partially along a length of the condensation tray, the second side of each of the plurality of valleys configured to pool condensate and the first side of each of the plurality of valleys configured to channel air flow to one or more gas apertures;
- a plurality of peaks alternating with the plurality of valleys, the plurality of peaks disposed along the width of the condensation tray and extending at least partially along the length of the condensation tray, each peak of the plurality of peaks configured to divert the condensate into one or more valley of the plurality of valleys; and
- the one or more gas apertures disposed proximate at least one of the plurality of peaks.

16. The water heater system of claim 15, wherein:
the primary heat exchanger comprises a first plurality of coils;
the secondary heat exchanger comprises a second plurality of coils;
the first side of each of the plurality of valleys is positioned toward the primary heat exchanger; and
the second side of each of the plurality of valleys is positioned toward the secondary heat exchanger.

17. The water heater system of claim 16, wherein:
a first row of coils in the second plurality of coils is positioned above the plurality of peaks; and
a second row of coils in the second plurality of coils is positioned above the plurality of valleys.

18. The water heater system of claim 16, wherein each of the plurality of peaks comprises:
- an upper ridge configured to divert the condensate from the second plurality of coils; and
- a first overhang extending from the upper ridge in a direction along the width of the condensation tray and at least partially covering a first valley of the plurality of valleys,
wherein at least one of the one or more gas apertures is disposed on an underhang of the first overhang.

19. The water heater system of claim 16, wherein each of the plurality of peaks comprises:
- an upper ridge configured to divert the condensate from the second plurality of coils;
- a first overhang extending from the upper ridge in a first direction along the width of the condensation tray and at least partially covering a first valley of the plurality of valleys; and
- a second overhang extending from the upper ridge in a second direction along the width of the condensation tray and at least partially covering a second valley of the plurality of valleys,
wherein a first gas aperture is disposed on a first underhang of the first overhang, and
wherein a second gas aperture is disposed on a second underhang of the second overhang.

20. The water heater system of claim 15, further comprising an outer cabinet directing the combustion gases across the primary heat exchanger, through the condensation tray, and across the secondary heat exchanger,
wherein a width of the condensation tray extends entirely from a first sidewall of the outer cabinet to a second sidewall of the outer cabinet.

* * * * *